(No Model.)
C. I. CALVERT.
SOD TRANSPLANTER AND CUTTER.
No. 284,720. Patented Sept. 11, 1883.
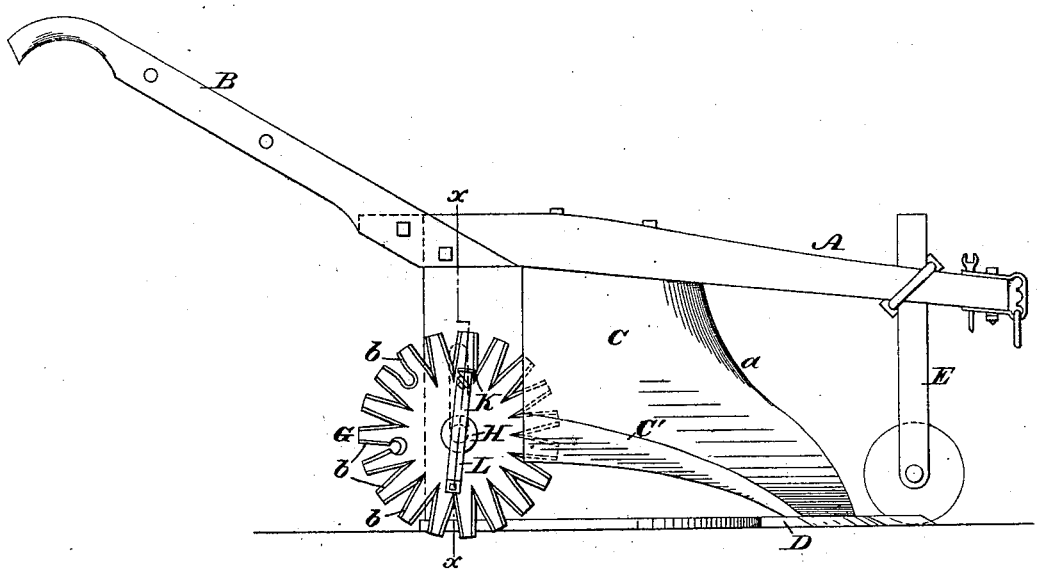
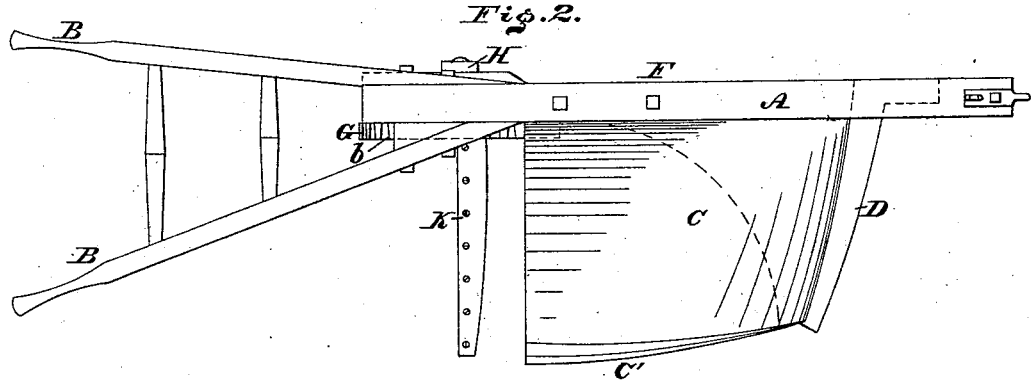
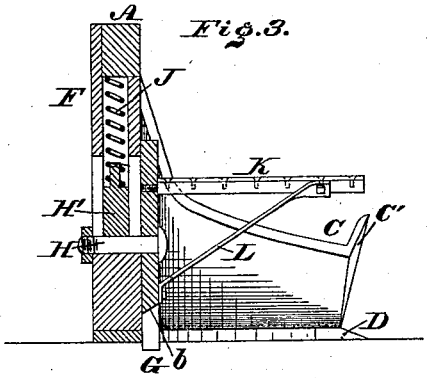
WITNESSES:
A. P. Grant,
W. F. Kircher
INVENTOR:
Callender I. Calvert,
BY John A. Diedersheim
ATTORNEY.

UNITED STATES PATENT OFFICE.

CALLENDER I. CALVERT, OF PHILADELPHIA, PENNSYLVANIA.

SOD TRANSPLANTER AND CUTTER.

SPECIFICATION forming part of Letters Patent No. 284,720, dated September 11, 1883.

Application filed January 30, 1883. (No model.)

*To all whom it may concern:*

Be it known that I, CALLENDER I. CALVERT, a citizen of the United States, residing in the city and county of Philadelphia, State of Pennsylvania, have invented a new and useful Improvement in Sod Transplanters and Cutters, which improvement is fully set forth in the following specification and accompanying drawings, in which—

Figure 1 is a side elevation of a sod transplanter and cutter embodying my invention. Fig. 2 is a top or plan view thereof. Fig. 3 is a vertical section in line $xx$, Fig. 1.

Similar letters of reference indicate corresponding parts in the several figures.

This invention relates to sod transplanters and cutters; and it consists of a horizontal flat-top blade and a mold-board and guard, said parts being all rigidly secured together and the rearward passage of the sod therefrom being unobstructed, in combination with a transversely-extending rotary cutter, whereby the sod is cut into suitable strips and lengths.

It also consists of the combination, in a sod-cutter, of a transversely-horizontal blade for cutting the roots of the grass, with a rotary blade which cuts the sod in suitable lengths, a vertically-movable wheel which carries said rotary blade, and a spring which holds said wheel down to its work.

It further consists of a mold-board for a sod-cutter, in combination with a toothed wheel and an axial bolt or journal for said wheel, a vertically-slotted bearing for said journal, and a laterally-extending knife carried by said wheel, the latter being adapted to turn in contact with the ground, and held thereto by a spring or gravity with a yielding pressure.

Referring to the drawings, A represents a beam, which is provided with handles B, and has secured to it a mold-board, C, at the forward edge of the bottom whereof is a transversely-extending cutter, D, which is horizontal and flat on its top, as shown in Fig. 2.

F represents the landside, to which is pivoted, at the rear of the mold-board, a toothed wheel, G, the axial bolt H of which is fitted in a vertical slot in said landside, and is forced down by a spring, J, which bears against a plug or block, H', which rests on the bolt H, but is not an essential feature, said spring being adapted to cause the wheel G to take firm hold of the ground and rise and fall, due to any irregularities thereof.

Projecting laterally from the wheel G, on the mold-board side, is a horizontally-arranged transversely-extending blade, K, which is firmly secured to said wheel and strengthened by a brace, L, whose ends are connected with said blade and wheel, said blade being so disposed that when the wheel G is rotated the blade in its rotation sweeps around the rear edge of the mold-board, said edge thus forming a bed for the blade. The mold-board has but a slight curvature in transverse direction, and has at its outer side an upwardly-projecting flange, C', which extends from front to rear of the mold-board.

When the device is moved forward, the cutter D passes under the sod and cuts its roots and releases it from the ground, the inner edge, $a$, of the mold-board dividing the sod in the direction of the length thereof. The sod is then raised by the mold-board and carried rearward thereon without being overturned, the side flange, C', preventing the sod from slipping laterally from the mold-board.

The wheel G, rotating as soon as the device is started, carries around the blade K, and when it reaches the sod just above the rear edge of the mold-board it cuts thereinto and severs it from the part resting on the mold-board, whereby the sod is cut in uniform pieces or lengths, which drop successively on the ground. The teeth of the wheel G take firm hold of the ground and prevent slipping thereof, whereby the blade K will be unfailingly and uniformly operated, and said wheel may be removed and one of greater or less diameter substituted therefor in order to change the length of pieces of the sod into which it is cut.

In order to prevent clogging of the spaces between the teeth of the wheel G, the sides of said teeth are beveled, as at $b$, and the inner termination of said spaces may be widened, whereby when dirt enters the spaces and is forced inwardly it is directed toward the side of the wheel, thus clearing the teeth.

Having thus described my invention, what

I claim as new, and desire to secure by Letters Patent, is—

1. The horizontal flat-top blade D, mold-board C, and guard C', said parts being all rigidly secured together and the rearward passage of the sod therefrom being unobstructed, in combination with a transversely-extending rotary cutter, whereby the sod is cut into suitable strips and lengths, substantially as shown.

2. In a sod-cutter, the combination of a transverse horizontal blade for cutting the roots of the grass, with a rotary blade which cuts the sod in suitable lengths, a vertically-movable wheel which carries said rotary blade, and a spring which holds said wheel down to its work, substantially as set forth.

3. In a sod-cutter, a mold-board, in combination with a toothed wheel, G, an axial bolt or journal for said wheel, a vertically-slotted bearing for said journal, and a laterally-extending knife carried by said wheel, the latter being adapted to turn in contact with the ground, and held thereto by a spring or gravity with a yielding pressure, substantially as set forth.

CALLENDER I. CALVERT.

Witnesses:
JOHN A. WIEDERSHEIM,
A. P. GRANT.